(12) United States Patent
Ekambaram et al.

(10) Patent No.: US 11,004,095 B2
(45) Date of Patent: May 11, 2021

(54) MICRO-SERVICE SEQUENCING AND RECOMMENDATION

(71) Applicant: International Business Machines Corporation, Armonk, NY (US)

(72) Inventors: Vijay Ekambaram, Chennai (IN); Padmanabha Venkatagiri Seshadri, Mysore (IN); Vijay Kumar Anantapur Bache, Bangalore (IN); Bidhu Ranjan Sahoo, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 126 days.

(21) Appl. No.: 16/202,960

(22) Filed: Nov. 28, 2018

(65) Prior Publication Data

US 2020/0167805 A1 May 28, 2020

(51) Int. Cl.
*G06Q 30/00* (2012.01)
*G06Q 30/02* (2012.01)
*G06Q 30/06* (2012.01)

(52) U.S. Cl.
CPC ..... *G06Q 30/0201* (2013.01); *G06Q 30/0236* (2013.01); *G06Q 30/0239* (2013.01); *G06Q 30/0253* (2013.01); *G06Q 30/0631* (2013.01)

(58) Field of Classification Search
None
See application file for complete search history.

(56) References Cited

U.S. PATENT DOCUMENTS

| | | | |
|---|---|---|---|
| 8,676,565 B2 | 3/2014 | Larcheveque et al. | |
| 8,694,304 B2 | 4/2014 | Larcheveque et al. | |
| 9,158,772 B2 | 10/2015 | Clark et al. | |
| 9,336,485 B2 | 5/2016 | Haggar et al. | |
| 9,374,327 B2 | 6/2016 | Rao DV | |
| 9,473,447 B1 | 10/2016 | Morrison et al. | |
| 9,516,467 B1 * | 12/2016 | Cronin | G06Q 30/0261 |

(Continued)

OTHER PUBLICATIONS

STIC EIC 3600 Search Report for application 16202960 dated Sep. 30, 2020 (Year: 2020).*

(Continued)

*Primary Examiner* — Matthew T Sittner
(74) *Attorney, Agent, or Firm* — Ference & Associates LLC

(57) ABSTRACT

One embodiment provides a method, including: obtaining, from an application used by users to converse with other users, a conversation corresponding to a user, wherein the conversation includes an indication of an intent to purchase a plurality of retail services; identifying at least one micro-service corresponding to each of the plurality of retail services, wherein the micro-service allows purchase from the corresponding retail service; sequencing the micro-services, thereby sequencing purchases from the plurality of retail services through the micro-services, wherein the sequencing comprises (i) determining a sequence of purchases and (ii) identifying, for each of the determined sequences, a financial benefit to the user; and providing a recommendation comprising a purchasing sequence to the user, wherein the recommendation comprises the sequence of purchases that result in the maximum financial benefit to the user.

15 Claims, 4 Drawing Sheets

(56) References Cited

U.S. PATENT DOCUMENTS

| | | | |
|---|---|---|---|
| 9,621,503 B2 | 4/2017 | Rajagopalan et al. | |
| 2005/0071225 A1* | 3/2005 | Bortolin | G06Q 30/0235 |
| | | | 705/14.35 |
| 2006/0116138 A1 | 6/2006 | Simsek et al. | |
| 2008/0201219 A1* | 8/2008 | Broder | G06Q 30/02 |
| | | | 705/14.55 |
| 2011/0055054 A1* | 3/2011 | Glasson | G07G 1/0063 |
| | | | 705/27.2 |
| 2011/0320187 A1 | 12/2011 | Motik et al. | |
| 2013/0166526 A1 | 6/2013 | Moxley et al. | |
| 2013/0311315 A1* | 11/2013 | Zises | G06Q 30/0605 |
| | | | 705/26.2 |
| 2013/0311997 A1 | 11/2013 | Gruber et al. | |
| 2014/0006012 A1 | 1/2014 | Zhou et al. | |
| 2015/0058157 A1* | 2/2015 | Tamir | G06Q 90/20 |
| | | | 705/26.7 |
| 2015/0310131 A1* | 10/2015 | Greystoke | G06F 16/951 |
| | | | 707/722 |
| 2017/0026318 A1 | 1/2017 | Daniel et al. | |
| 2018/0039618 A1 | 2/2018 | Kumar et al. | |
| 2019/0188771 A1* | 6/2019 | Rajagopal | G06Q 20/202 |

OTHER PUBLICATIONS

Bugayenko, Yegor, "A Chatbot Is Better Than a UI for a Microservice", Nov. 3, 2015, 11 pages. Seattle, Washington, USA. accessed at https://www.yegor256.com/2015/11/03/chatbot-better-than-ui-for-microservice.html on Aug. 1, 2018.

Galley, Michel et al., "Discourse Segmentation of Multi-Party Conversation", Proceedings of the 41st Annual Meeting on Association for Computational Linguistics, Jul. 21, 2003, 9 pages, vol. 1, Association for Computational Linguistics, Stroudsburg, Pennsylvania, USA. accessed at https://www.microsoft.com/an-us/research/wp-content/uploads/2017/01/P03-1071-1.pdf on Jul. 30, 2018.

Li, Jiwei et al., "A Persona-Based Neural Conversation Model", Proceedings of the 54th Annual Meeting of the Association for Computational Linguistics, Berlin, Germany, Aug. 7-12, 2016, pp. 994-1003, Association for computational Linguistics, Stroudsburg, Pennsylvania, USA.

Schlicht, Matt, "How Bots Will Completely Kill Websites and Mobile Apps", Nov. 2, 2016, 10 pages. accessed at https://chatbotsmagazine.com/how-bots-will-completely-kill-websites-and-mobile-apps-656db8e6fc03 on Jul. 30, 2018.

Mesnil, Gregoire et al., "Using Recurrent Neural Networks for Slot Filling in Spoken Language Understanding", IEEE/ACM Transactions on Audio, Speech, and Language Processing, 2015 (submitted 2013), 14 Pages, vol. 23, No. 3, IEEE Xplore Digital Library. accessed at http://citeseerx.ist.psu.edu/viewdoc/download?doi=10.1.1.918.4061&rep=rep1&type=pdf on Jul. 30, 2018.

Wang, Kai et al., "A Syntactic Tree Matching Approach to Finding Similar Questions in Community-based QA Services", SIGIR'09, Jul. 19-23, 2009, Boston, Massachusetts, USA, 8 Pages, ACM Digital Library.

Yao, Kaisheng et al., "Spoken Language Understanding Using Long Short-Term Memory Neural Networks", IEEE, 2014, pp. 189-194, IEEE Digital Library. accessed at https://groups.csail.mit.edu/sls/publications/2014/Zhang_SLT_2014.pdf on Jul. 31, 2018.

\* cited by examiner

MICRO-SERVICE SEQUENCING AND RECOMMENDATION

BACKGROUND

People communicate with each other using many different techniques, for example, email, telephone calls, messenger applications, social network sites, and the like. Many of these techniques allow groups of people to communicate with each other, rather than just two people communicating back and forth. For example, messenger applications allow many people to join the same communication session, thereby allowing all the participants to see what other participants have communicated. The group communication mechanisms are useful to groups of users who want to collaborate or communicate with everyone within the group at the same time. Many times these group communication sessions are used by a group of individuals, for example, friends, family members, or the like, to plan activities and/or outings. For example, a group of friends may use a group communication session to plan an outing to watch a movie and have dinner.

BRIEF SUMMARY

In summary, one aspect of the invention provides a method, comprising: obtaining, from an application used by users to converse with other users, a conversation corresponding to a user, wherein the conversation includes an indication of an intent to purchase a plurality of retail services; identifying at least one micro-service corresponding to each of the plurality of retail services, wherein the micro-service allows purchase from the corresponding retail service; sequencing the micro-services, thereby sequencing purchases from the plurality of retail services through the micro-services, wherein the sequencing comprises (i) determining a sequence of purchases and (ii) identifying, for each of the determined sequences, a financial benefit to the user; and providing a recommendation comprising a purchasing sequence to the user, wherein the recommendation comprises the sequence of purchases that result in the maximum financial benefit to the user.

Another aspect of the invention provides an apparatus, comprising: at least one processor; and a computer readable storage medium having computer readable program code embodied therewith and executable by the at least one processor, the computer readable program code comprising: computer readable program code configured to obtain, from an application used by users to converse with other users, a conversation corresponding to a user, wherein the conversation includes an indication of an intent to purchase a plurality of retail services; computer readable program code configured to identify at least one micro-service corresponding to each of the plurality of retail services, wherein the micro-service allows purchase from the corresponding retail service; computer readable program code configured to sequence the micro-services, thereby sequencing purchases from the plurality of retail services through the micro-services, wherein the sequencing comprises (i) determining a sequence of purchases and (ii) identifying, for each of the determined sequences, a financial benefit to the user; and computer readable program code configured to provide a recommendation comprising a purchasing sequence to the user, wherein the recommendation comprises the sequence of purchases that result in the maximum financial benefit to the user.

An additional aspect of the invention provides a computer program product, comprising: a computer readable storage medium having computer readable program code embodied therewith, the computer readable program code executable by a processor and comprising: computer readable program code configured to obtain, from an application used by users to converse with other users, a conversation corresponding to a user, wherein the conversation includes an indication of an intent to purchase a plurality of retail services; computer readable program code configured to identify at least one micro-service corresponding to each of the plurality of retail services, wherein the micro-service allows purchase from the corresponding retail service; computer readable program code configured to sequence the micro-services, thereby sequencing purchases from the plurality of retail services through the micro-services, wherein the sequencing comprises (i) determining a sequence of purchases and (ii) identifying, for each of the determined sequences, a financial benefit to the user; and computer readable program code configured to provide a recommendation comprising a purchasing sequence to the user, wherein the recommendation comprises the sequence of purchases that result in the maximum financial benefit to the user.

A further aspect of the invention provides a method, comprising: obtaining, at a conversational agent, a conversation of a user indicating a desire to purchase a plurality of retail services; identifying, at the conversational agent, at least one micro-service, for each of the plurality of retail services, that allows online purchase of the corresponding retail service by analyzing the conversation, wherein the identifying comprises determining, for each micro-service, if the micro-service has a corresponding offer; creating a plurality of series of micro-services, wherein each series achieves the desired purchases of the plurality of retail services and wherein each series results in a series having an identified benefit obtained by performing the micro-service purchases in the identified series; determining the series of micro-services that results in the maximum identified benefit to the user; and recommending, to the user, the series having the maximum identified benefit.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

Figure 1:
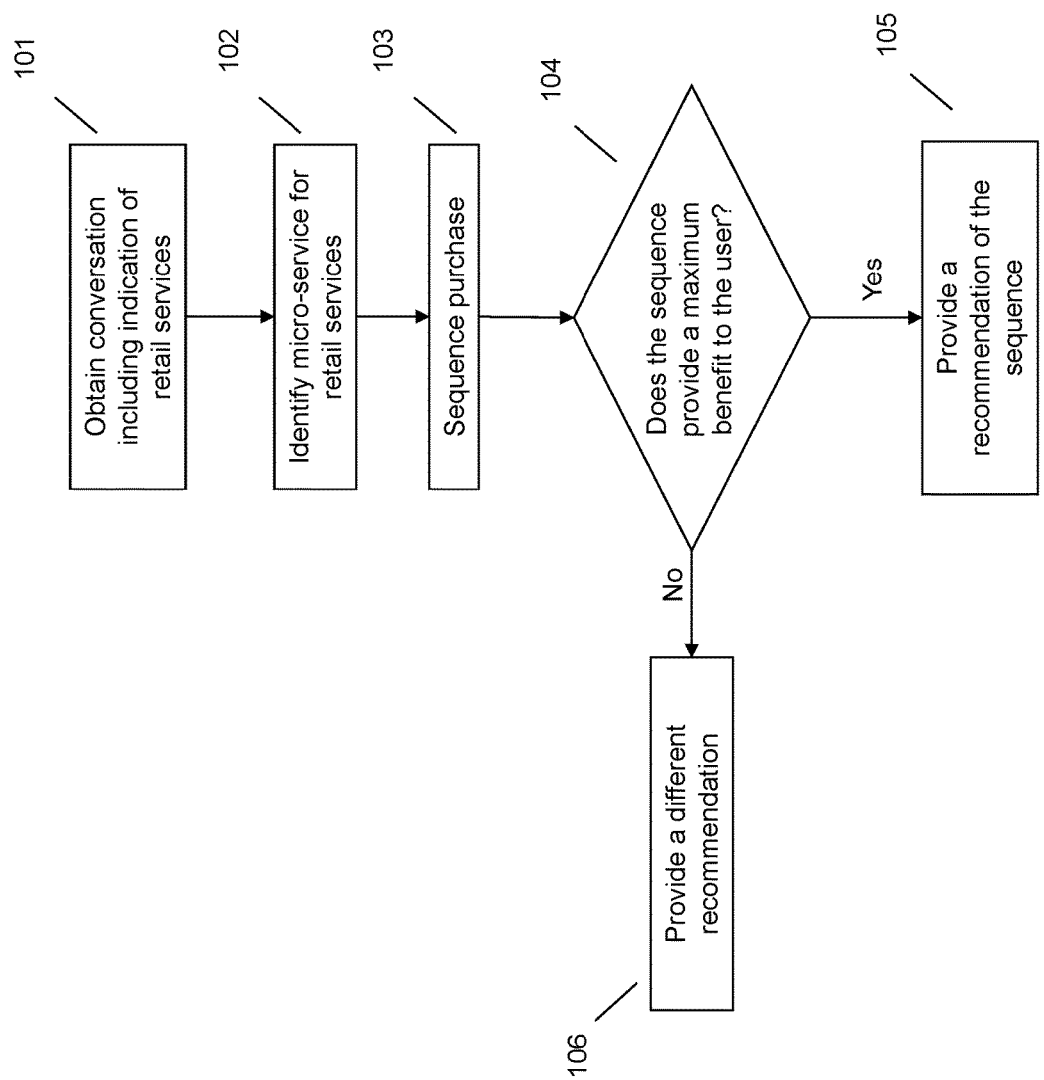
FIG. 1 illustrates a method of identifying micro-services for retail services identified within a conversation and sequencing the purchase through the micro-services to provide a maximum benefit to a user.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The illustrated embodiments of the invention will be best understood by reference to the figures. The following description is intended only by way of example and simply illustrates certain selected exemplary embodiments of the invention as claimed herein. It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will be made here below to FIGS. 1-4. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 4. In accordance with an example embodiment, most if not all of the process steps, components and outputs discussed with respect to FIGS. 1-3 can be performed or utilized by way of a processing unit or units and system memory such as those indicated, respectively, at 16' and 28' in FIG. 4, whether on a server computer, a client computer, a node computer in a distributed network, or any combination thereof.

More and more retail services are providing mechanisms for purchasing the products online. For example, many movie theaters provide micro-services that allow a user to purchase the movie ticket online. As another example, many food providers provide applications or micro-services that allow a user to place a food order and pay for that order online. Thus, when a group of users plans an outing, particularly using an online communication mechanism, many of the purchases required for the outing can be made using a micro-service associated with each entity involved in the outing. The micro-services may also have conversational agents that can assist a user in making the purchase or with any questions that the user has about the service. For example, a user may access a movie theater micro-service which may have a conversational agent that can assist the user in making a movie ticket purchase.

A conversational agent can analyze the conversation of the user(s) and provide assistance in performing a task identified within the conversation. For example, when a user accesses a shopping site and requests assistance through the website, the conventional mechanism for providing this assistance is through a conversational agent. The conversational agent can analyze the user's request and then provide output that is responsive to the request, thereby assisting the user with the request. However, traditional conversational agents are used to assist users with specific requests provided by the user to the conversational agent system. In other words, conversational agents are generally only deployed for specific purposes and are tied to specific sites, for example, as a technical assistance agent for a service provider website, as a shopping assistant on a retail website, as a tutoring agent within a tutoring application, and the like.

However, there are no conventional systems that combine the technology of the conversational agent which can analyze and process natural language input provided by users with the micro-services architecture. Specifically, no conventional technology can leverage the conversational agent technology to analyze a group conversation, identify desired services, and then assist the user in purchasing these services through micro-service architecture. Additionally, since conversational agents are generally deployed for a specific purpose and are associated with a specific site, the conversational agent is unable to assist the user with all aspects of an outing. Rather, a user would have to access a different conversational agent for each of the entities associated with the outing.

Accordingly, an embodiment provides a system and method for identifying micro-services for retail services identified within a conversation and sequencing the purchase through the micro-services to provide a maximum benefit to a user. The system obtains a conversation of a user or group of users, where the conversation identifies an intent to purchase a plurality of retail services. For example, a user or group of users may plan an outing to a restaurant and may also need a ride to the restaurant. Thus, the system can identify that the user(s) intend to purchase food at the restaurant and intend to purchase a ride to get to and from the restaurant. The system may then identify at least one micro-service that corresponds to each of the retail services, where the micro-service provides a mechanism for making a purchase associated with the retail service. For example, the system may identify a micro-service associated with the restaurant and may also identify a plurality of micro-services associated with methods of transport.

The system then generates a plurality of sequences for purchasing the micro-services or retail services. For example, the system may sequence purchases through a micro-service associated with one of the transport services before purchase through the micro-service associated with the restaurant. As another sequence, the system may sequence the purchase associated with the restaurant before the purchase of the transport service. Since the specific transport service was not specifically identified, the system may create many sequences using different transport services. For each of the sequences, the system may identify a financial benefit to the user for purchasing through the micro-services in the specified sequence or order. For example, a transport company may offer a 15% off coupon for the restaurant. Therefore, if the purchase associated with the transport company is performed first, then the 15% off coupon could be used for the restaurant, thereby providing a financial benefit to the user. However, if the purchases were reversed, the 15% off coupon could not be used because the restaurant purchase was already completed, thereby providing no financial benefit to the user. After the sequences are made and the benefits are identified, the system may provide a recommendation for a purchasing sequence that results in the greatest, or maximum, benefit to the user.

Such a system provides a technical improvement over current conversational agent systems by providing a conversational agent that is user-centric instead of product or entity specific. In other words, rather than being associated with a particular product or entity, the conversational agent is user-centric and not tied to a specific retail space. The conversational agent can monitor and analyze a group conversation to identify an intent or desire of the group and then assist the users in completing that intent. For example, if the group wants to attend a movie and have dinner, the conversational agent can assist the group with both of these intents. Additionally, since the conversational agent is not tied to a specific retail space, the conversational agent can identify a plurality of micro-services that can be used to complete the intent. Using these identified micro-services the conversational agent can identify a sequence for purchasing the micro-services that would result in a maximum benefit to the user(s). Thus, the described system and method provides a conversational agent that is focused on the user and focused on obtaining the maximum benefit to the user, as opposed to conventional conversational agents that are tied to a specific space or site and are unable to access services across multiple sites.

FIG. 1 illustrates a method for identifying micro-services for retail services identified within a conversation and sequencing the purchase through the micro-services to provide a maximum benefit to a user. At 101 the system obtains a conversation from a conversational application. The conversational application may be an application used by users to communicate with other users, including digital users (e.g., chatbots, digital assistants, etc.). For example, the system may obtain the conversation from a messenger application, social networking site, or any other conversational application that allows communication between users. To obtain the conversation, the system may be integral to the conversational application, for example, as an add-on to the conversational application. Alternatively, the system may be a stand-alone application that can monitor conversational applications.

The obtained conversation may be provided to a conversational agent, or the system may be a conversational agent. The conversational agent can analyze the conversation to identify whether the conversation includes an indication of an intent to purchase a plurality of retail services. The conversational agent can analyze the conversation using different processing and analysis techniques, for example, natural language processing, semantic analysis, syntactic analysis, and/or the like. In the event that the conversational application allows input in a format other than a text format, the analysis may include converting the content to a text format, for example, using a speech-to-text analysis technique, converting video to a transcript, or the like.

An indication of an intent or desire to purchase retail services may include one or more of the users identifying an entity that would be associated with retail services. For example, a user may identify a movie theater, restaurant, event center, event type (e.g., golf, bowling, laser tag, paintball, etc.), or the like. Identification of the entity may include identification of a particular entity, for example, a particular restaurant, or a genre of entities which does not identify a particular entity. The system can also identify from the analysis of the conversation that the user(s) intend to purchase one or more services from the one or more entities. The intent can be determined using the natural language processing techniques of the conversational agent.

The conversational agent may also identify other requirements from the conversation. For example, the conversational agent may identify a stipulation or pre-requisite for a retail service from the conversation. As an example, one or more users may indicate that the purchases should be made with a credit card. The conversational agent may also identify requirements or intents based upon a user preference or profile. For example, the user preference or profile may identify that at least one of the users has a preference for a particular restaurant or restaurant type. As another example, the user profile may identify that with a particular group of people, the user has one preference, whereas with a different group of people, the user has a different preference.

At 102 the system may identify one or more micro-services that correspond to each of the plurality of retail services. A micro-service is a service that is associated with the retail service and allows purchase of goods or services from the retail service. For example, the micro-service may include an application associated with the retail service that allows for purchase of the goods or services offered by the retail service. If the conversation specifically identifies a retail service, then to identify the micro-service, the system may simply identify the micro-service that is associated with that specifically identified retail space. In the case that a specific retail service is not identified, to identify the micro-services, the system may employ a micro-services knowledge builder. The micro-services knowledge builder obtains a plurality of micro-services and clusters the micro-services into micro-service clusters, where the clusters each represent a topic or genre of the micro-service. To cluster the micro-services, the system uses information related to the micro-service (e.g., source-code, test cases, related web forum content, etc.) to extract a topic list representing the micro-service. The system then creates topics or genres of micro-services by clustering the topic lists representing the micro-services, based upon the similarity of one topic list representing a micro-service to another topic list representing a micro-service.

The system may then identify one or more micro-services by comparing the genre or topic of retail service identified from the micro-service to the topic or genre of micro-services and using those micro-services of the identified genre or topic. Alternatively, the system may score each of the micro-services within an identified genre or topic based upon the topic list of each of the micro-services. The system may then compute a score for each of the micro-services. The score may be based upon the similarity of the topic list of the micro-service to the topic or genre identified within the conversation. The system can then rank the micro-services using the computed score and select the micro-service having the highest score. Alternatively, the system may select the micro-services having the top five scores, scores above a predetermined threshold, or the like.

In identifying the micro-services, the system may take into account any requirements or stipulations that were identified from the conversation or a user profile or preferences. For example, if the stipulation was that payment will be made by credit card, the system may only identify retail services that allow for payment via credit card. As another example, if one or more of the users has a preference for a particular restaurant type, the system may only identify those micro-services that are associated with that restaurant type. As another example, if the system identifies that the group of individuals corresponds to a group of individuals that prefer one activity over another, the system may identify those micro-services that are associated with the preferred activity.

At 103 the system may sequence the purchasing of the retail service through the micro-services. To sequence the purchasing the system may identify whether each micro-service has a corresponding benefit or offer, for example, by crawling the Internet for offers and benefits. For example, one micro-service may provide a 15% discount for use with another micro-service. As another example, one micro-service may provide a $10 off coupon for use with another micro-service. As another example, one user within the group may have access to a particular offer or benefit for one of the micro-services. For example, the user may have access to a credit card that offers a 20% discount on movie tickets. As another example, a user may have a coupon that is good for a particular restaurant. Additionally, in the sequencing, the system takes into account any of the pre-requisites or requirements that were previously identified. In taking into account the dependencies or pre-requisites, the system may create a micro-service dependency graph. The dependency graph includes nodes for each of the micro-services and then has edges that identify if one micro-service should be dependent on the other micro-service.

Sequencing the micro-services may include determining a sequence of purchases using the identified micro-services. The system may create a plurality of sequences using different orders and/or micro-services for each sequence. For example, one sequence may indicate that the movie ticket is purchased before the food is purchased, whereas another sequence may indicate that the food is purchased before the movie ticket. As another example, one sequence may indicate that a movie ticket is purchased before food is purchased from one micro-service, whereas another sequence may indicate that the movie ticket is purchased before food is purchased from a micro-service different than the first sequence. Each of the sequences accomplishes the desired intent as identified from the conversation. In other words, all of the created sequences must fulfill the requirements and intents of the conversation.

Figure 2:
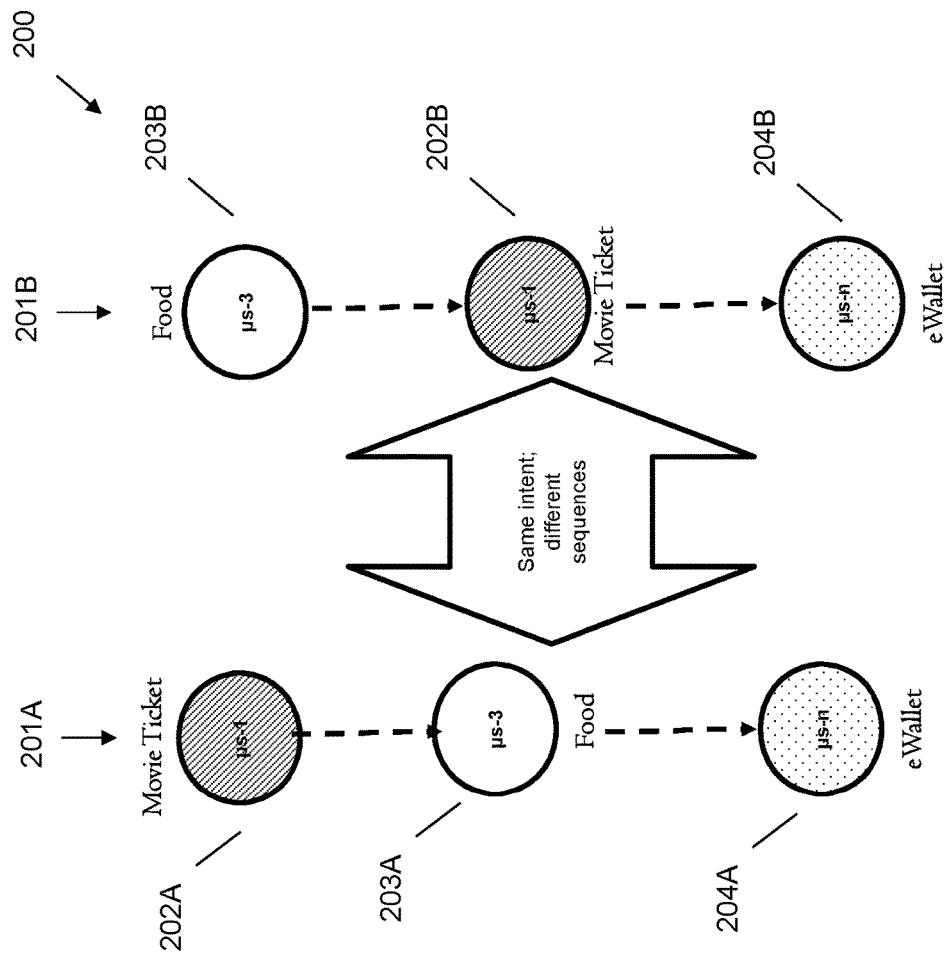
FIG. 2 illustrates an example of micro-services sequencing graph.

FIG. 2 illustrates an example sequencing graph 200. The system does not have to generate a sequence graph for each sequence. Rather, FIG. 2 is merely an illustration for understanding. In this example, the user wants to buy a movie ticket, order food to the theater, and pay with an eWallet. On the left-hand side is one sequence 201A, and the right-hand illustrates a different sequence 201B of the same micro-services. Both of the sequences 201A and 201B accomplish the same intent (i.e., purchase of a movie ticket, food, and payment with an eWallet), however the micro-services are ordered differently in the two sequences 201A and 201B. In the left sequence 201A the movie ticket 202A is purchased before the food 203A, with both being paid for using an eWallet 204A. In the right sequence 201B the food 203B is purchased before the movie ticket 202B, with both being paid for using an eWallet 204B.

Once the system has identified a sequence of micro-services, the system identifies the financial benefit that is obtained by the user through that sequence. This financial benefit is identified based upon the offers or benefits that are associated with the micro-service, as already identified. The system then calculates the financial benefit for performing the purchasing in the sequence or order identified within the sequence. For example, referring back to FIG. 2, if we assume that the purchase of the movie ticket provides a 15% discount for the food purchase, then the left sequence 201A would result in a 15% food discount benefit to the user. However, if we use the right sequence 201B, even though the user would still get the 15% food discount, this discount could not be applied because the food is already purchased. Thus, the right sequence 201B would result in no financial benefit to the user.

While generating the sequencing, the system may add additional micro-services to the sequencing in an attempt to provide a greater benefit to the user. One example of adding a micro-service is when the system identifies that an offer associated with a selected micro-service is being provided by a micro-service that is not one of the selected micro-services. However, the system may identify that the non-selected micro-service is related to one of the selected micro-services and may be of interest to the user, and may, therefore, create a sequence including the non-selected micro-service to determine a benefit to the user. For example, if a user has identified a movie theater and a restaurant to purchase goods and services from, and the system identifies that a transport service has an offer corresponding to the movie theater, the system may recommend the transport service for transportation in order to utilize the offer provided by the transport service.

Figure 3:
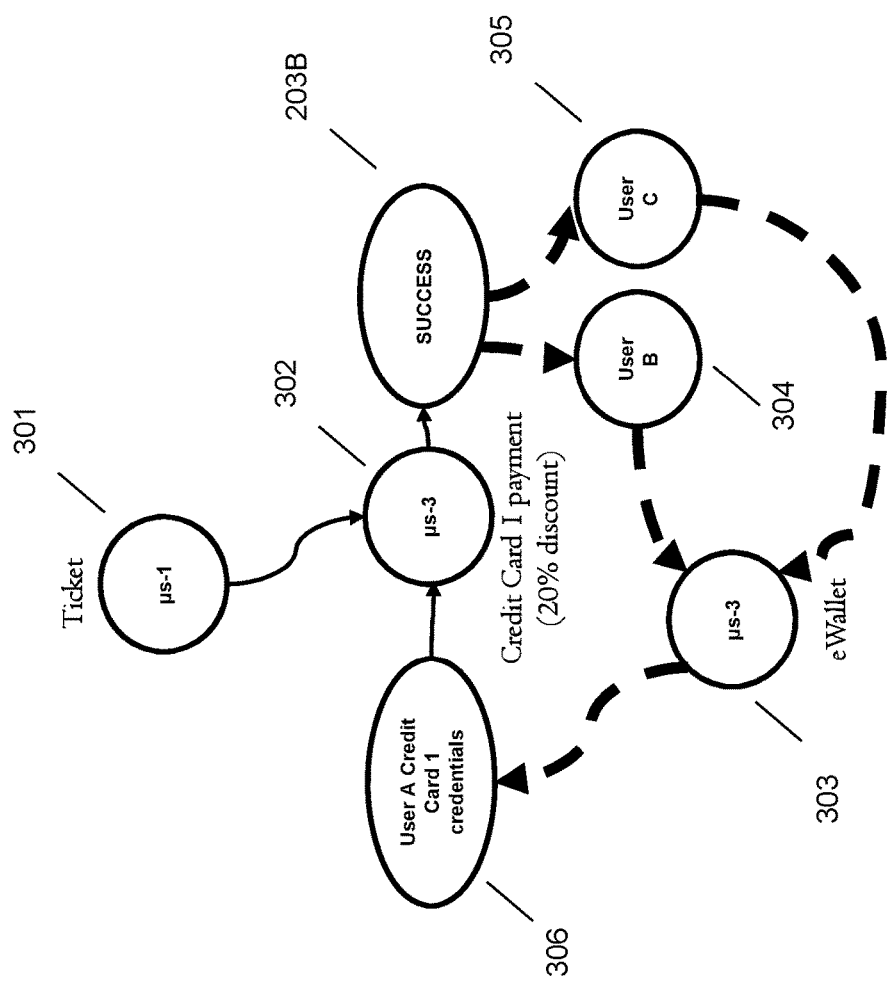
FIG. 3 illustrates an example of insertion of micro-services.

Another example of adding a micro-service may occur when one of the users has a benefit that is not accessible to the other users of the group. For example, if one member has a credit card that offers a 20% discount for movie tickets, the system may identify that this benefit provides a financial benefit but only if the user having the benefit buys all the movie tickets. In this case, the system may add micro-services for payment from the other users in the group to the user having the benefit. FIG. 3 illustrates an example of this type of adding micro-service transaction. The user having the benefit 302 purchases the tickets from the ticketing micro-service 301. The system then recognizes that this was successful, so the system then adds a micro-service from the eWallet 303 of User B 304 and User C 305 to pay the user having the benefit through the credit card 306. Thus, all the users get the benefit of the 20% discount of the user having the benefit and the user having the benefit gets payment to reimburse the expense.

Before using a benefit only accessible to one or a few of the users of the group, the system may determine whether the benefit should actually be used. For example, a user may be okay with the benefit being used with family members, but not okay with the benefit being used with friends. To determine if the benefit should be used, the system may identify the group coherence, or how each user is socially connected to other users in the group using a social-relationship ranking score. If the social-relationship ranking score does not exceed a particular threshold or predetermined number, the system may decide to not use or even offer use of the benefit to the group. If, on the other hand, the social-relationship ranking score does meet the desired threshold, the system may create a sequence using the benefit, recommend using the benefit to the user having the benefit, request the user authorize use of the benefit, or the like.

The system may then determine whether a sequence provides a maximum financial benefit to the user at 104. This determination may be performed simply by comparing the financial benefit of one sequence to the financial benefit of another sequence. Determination of the maximum benefit may be performed using an optimization problem. If the sequence does not provide the maximum financial benefit, the system may select another sequence for recommendation at 106. In the case that the sequence does provide the maximum financial benefit, the system may provide a recommendation of that sequence of purchasing to the user at 105. In the case that more than one sequence results in the same financial benefit, the system may provide the sequences as alternatives, select one for recommendation based upon preferences of the user, or may select one for recommendation based upon some other factor (e.g., most convenient, least number of transactions, protecting a one-time benefit accessible to only a single group member, etc.).

Thus, the described systems and methods represent a technical improvement over current conversational agent systems by providing a system that can access micro-services across a plurality of retail spaces, thereby creating a conversational agent that is user-centric rather than product or retail space specific. The system can analyze a user conversation, identify intended purchases of retail services, identify micro-services associated with the retail services, generate sequences for purchases of the retail services, and then identify which sequence provides the greatest benefit to the user(s) and provide a recommendation of the same. Thus, unlike conventional conversational agents that cannot act across retail spaces, the described system can not only act across multiple retails spaces, but can also identify purchasing orders for purchasing the retails services that would be most beneficial to the user.

Figure 4:
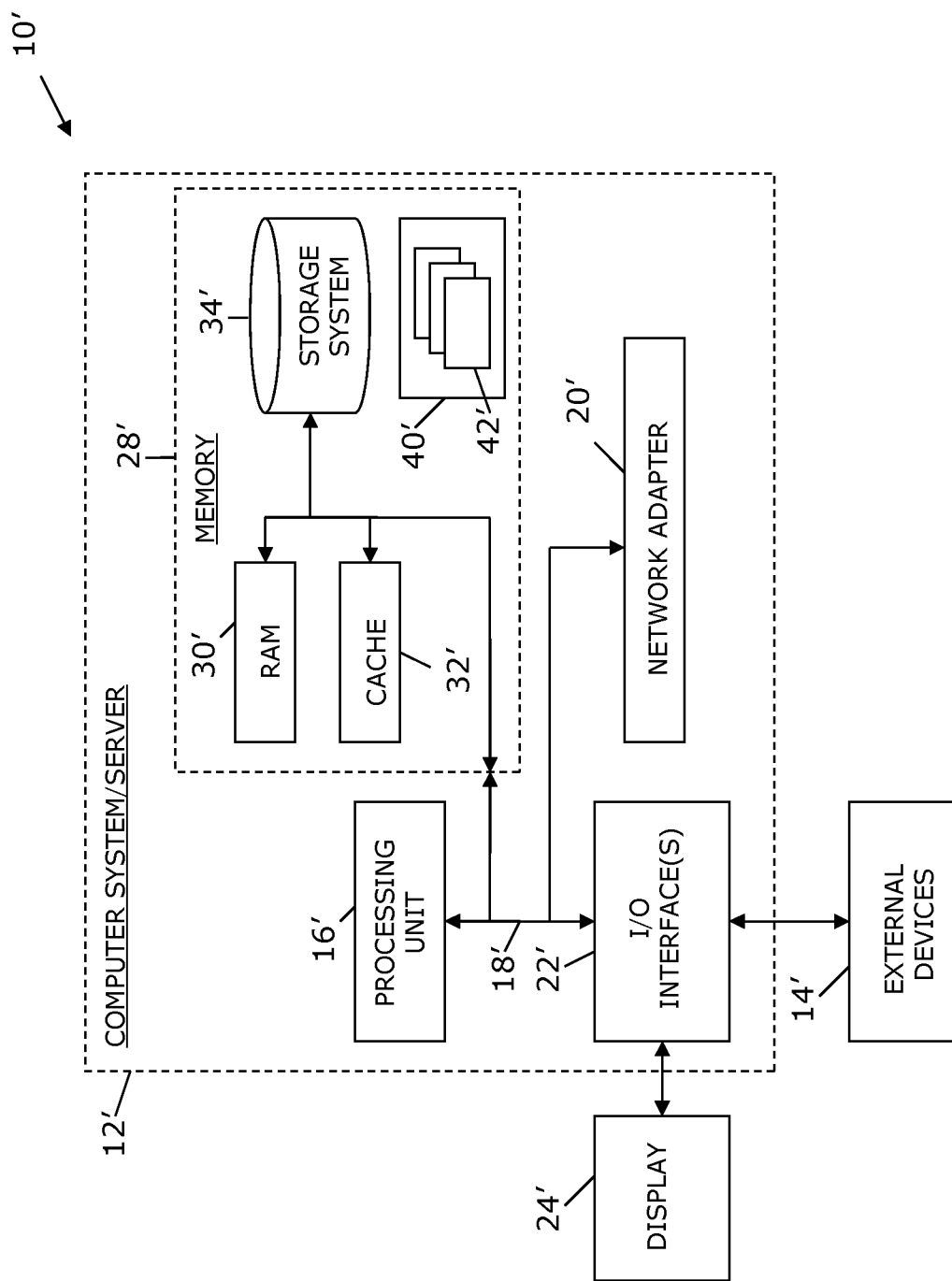
FIG. 4 illustrates a computer system.

As shown in FIG. 4, computer system/server 12' in computing node 10' is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method, comprising:
obtaining, from a conversational application installed on an information handling device of a user and used by users to converse with other users, a conversation corresponding to the user, wherein the conversation includes an indication of an intent to purchase a plurality of retail services;
identifying, using a conversational agent, at least one micro-service corresponding to each of the plurality of retail services, wherein the micro-service allows purchase from the corresponding retail service;
sequencing, using a system of the conversational agent, the micro-services, thereby sequencing purchases from the plurality of retail services through the micro-services, wherein the sequencing comprises (i) determining a sequence of purchases and (ii) identifying, for each of the determined sequences, a financial benefit to the user, wherein the sequencing comprises identifying a user from a group of users within the conversation having a user benefit not accessible to the other of the group of users and adding at least one micro-service to the sequence, each of the added micro-services corresponding to an internal transaction from one of the other of the group of users to the identified user for use of the user benefit; and providing, from the conversational agent, a recommendation comprising a purchasing sequence to the user, wherein the recommendation comprises the sequence of purchases that result in the maximum financial benefit to the user.

2. The method of claim 1, comprising identifying, from the conversation, a stipulation for at least one of the plurality of retail services.

3. The method of claim 2, wherein the identifying a micro-service comprises identifying a micro-service meeting the stipulation.

4. The method of claim 1, comprising identifying whether each of the micro-services has a corresponding offer and wherein the determining a financial benefit comprises incorporating the corresponding offer for the micro-service having the corresponding offer into the financial benefit.

5. The method of claim 1, wherein the identifying at least one micro-service comprises (i) scoring micro-services related to a category of the retail service, (ii) ranking the micro-services based upon the score, and (iii) selecting the micro-service having the highest score.

6. The method of claim 1, wherein the sequencing comprises identifying an additional micro-service corresponding to a retail service other than a retail service of the plurality of retail services, but that is similar to the plurality of retail services.

7. The method of claim 1, wherein the identifying at least one micro-service comprises identifying a micro-service matching a preference of the user.

8. The method of claim 1, wherein the application is not tied to a retail service.

9. An apparatus, comprising:
at least one processor; and
a non-transitory computer readable storage medium having computer readable program code embodied therewith and executable by the at least one processor, the computer readable program code comprising:
computer readable program code configured to obtain, from a conversational application installed on an information handling device of a user and used by users to converse with other users, a conversation corresponding to the user, wherein the conversation includes an indication of an intent to purchase a plurality of retail services;
computer readable program code configured to identify, using a conversational agent, at least one micro-service corresponding to each of the plurality of retail services, wherein the micro-service allows purchase from the corresponding retail service;
computer readable program code configured to sequence, using a system of the conversational agent, the micro-services, thereby sequencing purchases from the plurality of retail services through the micro-services, wherein the sequencing comprises (i) determining a sequence of purchases and (ii) identifying, for each of the determined sequences, a financial benefit to the user, wherein the sequencing comprises identifying a user from a group of users within the conversation having a user benefit not accessible to the other of the group of users and adding at least one micro-service to the sequence, each of the added micro-services corresponding to an internal transaction from one of the other of the group of users to the identified user for use of the user benefit; and computer readable program code configured to provide, from the conversational agent, a recommendation comprising a purchasing sequence to the user, wherein the recommendation comprises the sequence of purchases that result in the maximum financial benefit to the user.

10. A computer program product, comprising:
a non-transitory computer readable storage medium having computer readable program code embodied therewith, the computer readable program code executable by a processor and comprising:
computer readable program code configured to obtain, from a conversational application installed on an information handling device of a user and used by users to converse with other users, a conversation corresponding to the user, wherein the conversation includes an indication of an intent to purchase a plurality of retail services;
computer readable program code configured to identify, using a conversational agent, at least one micro-service corresponding to each of the plurality of retail services, wherein the micro-service allows purchase from the corresponding retail service;
computer readable program code configured to sequence, using a system of the conversational agent, the micro-services, thereby sequencing purchases from the plurality of retail services through the micro-services, wherein the sequencing comprises (i) determining a sequence of purchases and (ii) identifying, for each of the determined sequences, a financial benefit to the user, wherein the sequencing comprises identifying a user from a group of users within the conversation having a user benefit not accessible to the other of the group of users and adding at least one micro-service to the sequence, each of the added micro-services corresponding to an internal transaction from one of the other of the group of users to the identified user for use of the user benefit; and
computer readable program code configured to provide, from the conversational agent, a recommendation comprising a purchasing sequence to the user, wherein the recommendation comprises the sequence of purchases that result in the maximum financial benefit to the user.

11. The computer program product of claim 10, comprising identifying, from the conversation, a stipulation for at least one of the plurality of retail services.

12. The computer program product of claim 11, wherein the identifying a micro-service comprises identifying a micro-service meeting the stipulation.

13. The computer program product of claim 10, comprising identifying whether each of the micro-services has a corresponding offer and wherein the determining a financial benefit comprises incorporating the corresponding offer for the micro-service having the corresponding offer into the financial benefit.

14. The computer program product of claim 10, wherein the identifying at least one micro-service comprises (i) scoring micro-services related to a category of the retail service, (ii) ranking the micro-services based upon the score, and (iii) selecting the micro-service having the highest score.

15. The computer program product of claim 10, wherein the sequencing comprises identifying an additional microservice corresponding to a retail service other than a retail service of the plurality of retail services, but that is similar to the plurality of retail services.

\* \* \* \* \*